United States Patent
Symonds

[19]

[11] Patent Number: 5,624,135
[45] Date of Patent: Apr. 29, 1997

[54] PORTABLE SEAT BELT

[75] Inventor: Barbara J. Symonds, Houston, Tex.

[73] Assignee: Portabelt Joint Venture, Houston, Tex.

[21] Appl. No.: 369,895

[22] Filed: Jan. 9, 1995

[51] Int. Cl.⁶ ............................................. B60R 22/00
[52] U.S. Cl. .................... 280/801.1; 297/468; 297/484; 297/485
[58] Field of Search .................... 280/801.1, 808; 297/464, 485, 468, 483, 484, 486

[56] References Cited

U.S. PATENT DOCUMENTS

| 3,162,485 | 12/1964 | Prangnell | 297/389 |
| 3,834,758 | 9/1974 | Soule | 297/389 |
| 3,994,513 | 11/1976 | Courtis et al. | 280/808 |
| 4,205,670 | 6/1980 | Owens | 297/464 |
| 4,632,425 | 12/1986 | Barratt | 280/808 |
| 4,709,966 | 12/1987 | Parkinson et al. | 297/484 |
| 4,973,083 | 11/1990 | Richards et al. | 280/801 |
| 5,001,791 | 3/1991 | Toso | 297/464 |
| 5,299,855 | 4/1994 | Zubeck | 297/485 |
| 5,380,067 | 1/1995 | Turvill et al. | 297/468 |

FOREIGN PATENT DOCUMENTS

| 614788 | 9/1994 | European Pat. Off. | 280/808 |

*Primary Examiner*—Eric D. Culbreth
*Attorney, Agent, or Firm*—Conley, Rose & Tayon, PC

[57] ABSTRACT

The present invention relates to seat belts. More particularly, the present invention comprises a seat belt that can be easily attached to an existing bench seat, such as a school bus seat. The present invention comprises a length of suitable webbing that is adapted to form two loops that each encircle the back of a bench seat. The loops are preferably joined near the seat portion of the bench seat and each loop can be opened to allow installation onto the seat and to allow access to the passenger. In this manner, a lap restraint and a pair of shoulder restraints are formed.

6 Claims, 5 Drawing Sheets

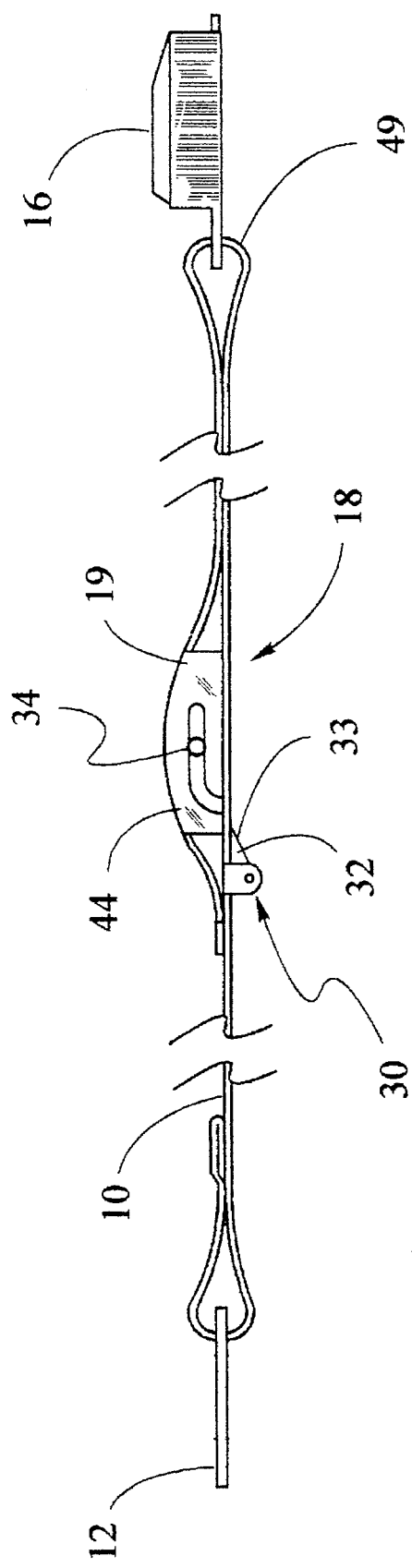
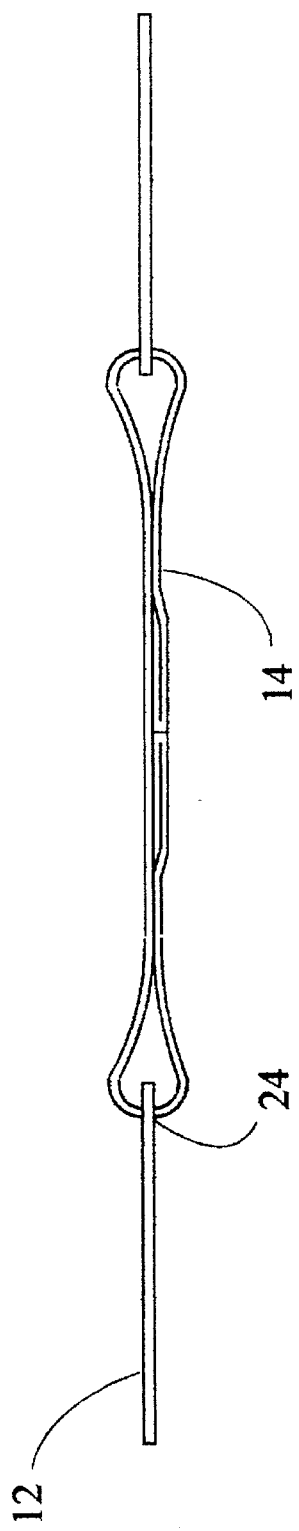
FIG 2
FIG 3

PORTABLE SEAT BELT

BACKGROUND OF THE INVENTION

1. Field of the Invention

The present invention relates to an apparatus and method for restraining individuals in bench type seats, such as are commonly found in school buses. More specifically, the invention relates to a portable strap assembly that can be used to restrain individuals in their seats, particularly in accident situations.

2. Description of Related Art

The system of restraint in school buses manufactured today does not include seat belts. Thus, when a school bus is involved in an accident, its occupants may be thrown from their seats and collide with each other or with objects inside the bus. In extreme instances, individuals may even be thrown from the bus itself. Furthermore, the impact of an occupant with an object in the vehicle incapacitate the occupant such that a timely evacuation of the vehicle was prevented. This could result in further injury.

In order to somewhat protect their occupants, school buses are designed to absorb some of the impact of these collisions so as to minimize injuries to occupants. Nevertheless, reliance on this method of protection still poses severe risks to bus occupants who are completely unanchored within the bus. In a side collision the occupants may be thrown through or against a window or into the edge of a seat or the wall of the bus. An occupant that is thrown from a vehicle is at risk from the vehicle rolling over on them or being thrown into the path of traffic or into other life threatening situations. If an occupant were bent over, as to retrieve an object from the floor, a collision with the seat in front could cause spinal injury, a concussion and/or unconsciousness. These risks would be greatly reduced if occupants were restrained in their seats.

At present, school buses do not provide any restraining means. It would be costly and time-consuming to retrofit existing school buses with seat belts or the like. Hence, a restraint is desired that may be easily attached to an existing seat, that is simple to use and provides an effective restraint in the event of a collision. Other objects and advantages of the invention will appear from the following description.

SUMMARY OF THE INVENTION

The present invention meets all of these objectives. The present restraint is removable from the seat and is therefore portable. Thus a child can carry the belt with his/her personal items and use it on vehicles that do not have seat belts. The present device provides a pair of shoulder straps and a lap belt, so that an individual using the device is effectively restrained thereby. The present device is adapted to be easily affixed to an existing bench seat without the use of tools or other modifications.

If desired, existing vehicles could be retrofitted with the present belt by permanently attaching it by conventional means.

BRIEF DESCRIPTION OF THE DRAWINGS

For a detailed description of a preferred embodiment of the invention reference will now be made to the accompanying drawings wherein:

FIG. 2 is a side view of the loop portion of the seat belt shown in FIG. 1;

FIG. 3 is a side view of the lap portion of the seat belt show in FIG. 1;

DETAILED DESCRIPTION OF THE INVENTION

The present invention comprises a webbing material that is fashioned into two shoulder belts that each encircle a shoulder and the back of a bench seat. The belts are preferably joined together at the waist near the seat portion of the bench seat to form a pair of continuous loops. Thus, each loop can be opened to allow installation onto the seat and to allow access by the passenger. In this manner, a lap restraint and a pair of shoulder restraints are formed.

Figure 1:
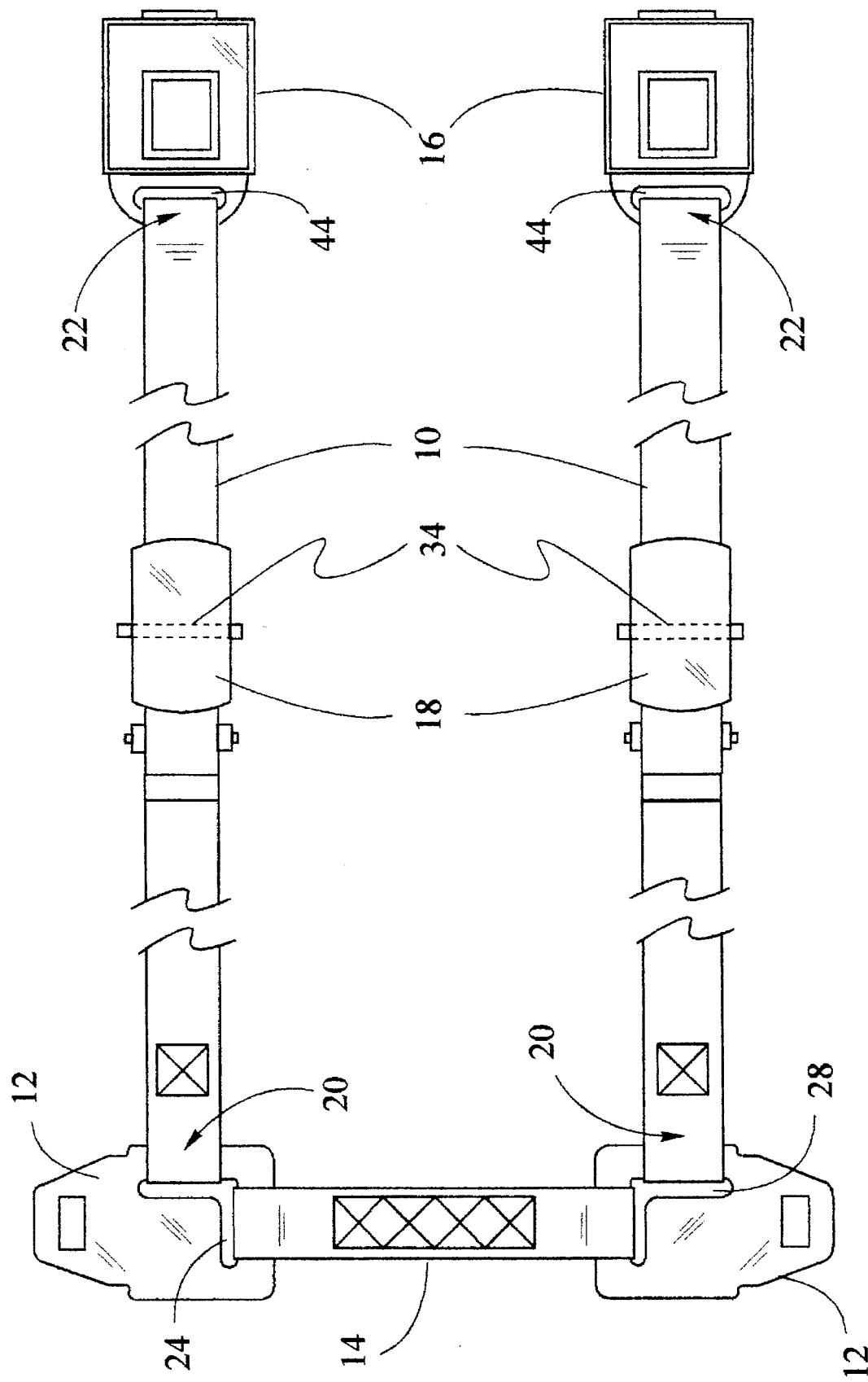
FIG. 1 is a plan view of the portable seat belt of the present invention.

FIG. 1 illustrates one embodiment of the present invention, comprising of two shoulder belts 10, two buckle tongues 12 joined by a belt 14, two buckle clasps 16 and two slide buckles 18 for adjusting the size of the loops.

Each shoulder belt 10 has two ends, namely, a fixed end 20 attached to buckle tongue 12 and an extending end 22 attached to buckle clasp 16. According to a preferred embodiment, means of attachment are provided that allow for adjustment of the length of the belt. Accordingly, buckle clasp 16 may be attached by means of adjustable slide assemblies such as a slide buckles 18, or by a slide assembly that is an integral fixture of buckle clasp 16 (not shown), such as are commonly found in automobiles with belts that lack retractors. Many other slide assemblies are well known in the art and are suitable for use in the present invention. The present invention is not limited to the particular adjustment means shown in the drawings or discussed in this text. In a second embodiment, extending end 22 is permanently affixed to buckle clasp 16 and is not adjustable. For example, end 22 may be affixed to buckle clasp 16 by feeding end 22 through a slot 44 in clasp 16, folding the strap back on itself and permanently joining the overlaid straps by sewing, adhesive or the like.

Still referring to FIG. 1, a slot 28 on buckle tongue 12 is provided for receiving the fixed end of the webbed belt material 10. Webbed belt material 10 is passed through the slot in a manner similar to that described above. It is folded back upon itself and affixed to the main body of the belt in a similar manner as described with respect to the ends of belt 14.

Figure 4:
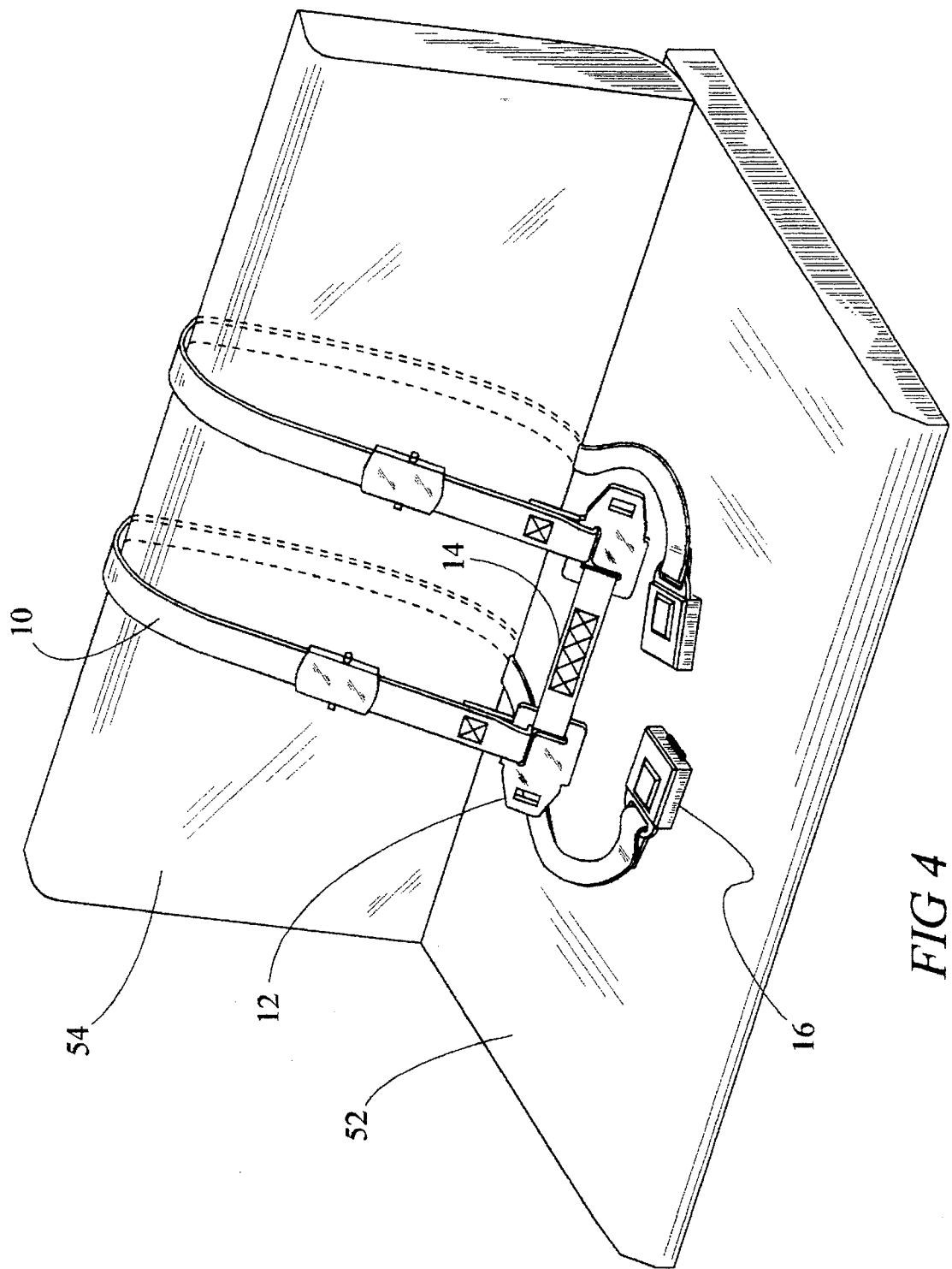
FIG. 4 is a perspective view of the seat belt shown in FIG. 1 as applied to a seat.

FIG. 2 illustrates a slide buckle 18 for adjusting the length of belt 10. Belt 10 passes through an engagement clamp 32 on the back side of slide buckle 18. Slide buckle 18 is mounted at a desired position along the belt by a mounting bracket 30. The engagement clamp 32 is shown in the engaged position with its teeth buried into the strap and engagement arm 33 pressed against the strap. This position of the arm prevents the strap 10 from slipping through the clamp. The belt passes through slot 44 of buckle clasp 16 and back through the metal housing 19 of slide buckle 18. In the slide buckle housing 19, the strap is grasped between a releasable engagement bar 34 and the metal housing 19 so that the strap will not slip upwards through slide buckle housing as it is shown in FIG. 4.

According to a preferred embodiment, the length of shoulder belt 10 is reduced by pulling the end 22 of belt 10 through the body of slide buckle 18. Such a means for adjusting the circumference of the loop is preferred, since it provides for secure passenger restraint on seats of various sizes and with passengers of various sizes. It will be understood, however, that the adjustment means disclosed herein could be omitted from the device without departing from the spirit of the invention.

Buckle clasps 16 and buckle tongues 12 are compatible so that tongue 12 can be received and engaged by the clasp 16. Preferably, buckle clasps 16 are equipped with a release mechanism for rapidly releasing the tongue. Such buckles are known in the art and are commonly found in automobiles and infant seats.

As shown in FIG. 1, buckle tongues 12 are connected by a webbed strap in a back-to-back arrangement. Referring now to FIG. 3, a preferred means for connecting the two buckle tongues 12 comprises a webbed belt material 14. Preferably, buckle tongues 12 are composed of a fiat metal and include a slot 24 for receiving a belt, as shown. The ends of belt 14 extend through slots 24 and are doubled back upon the body of the belt itself and permanently affixed thereto. The belt may be affixed by adhesives or preferably sewing in a manner sufficient to securely restrain a passenger. The preferred belt has a width that is substantially similar to the length of the slot, so that the belt can pass through the slot without crimping or folding over. Buckle tongues 12 are connected back-to-back so that they extend outwardly and can be conveniently received by receiver pieces 16. Buckle tongues 12 are preferably separated by no more than a few inches, preferably less than five inches.

Figure 6:
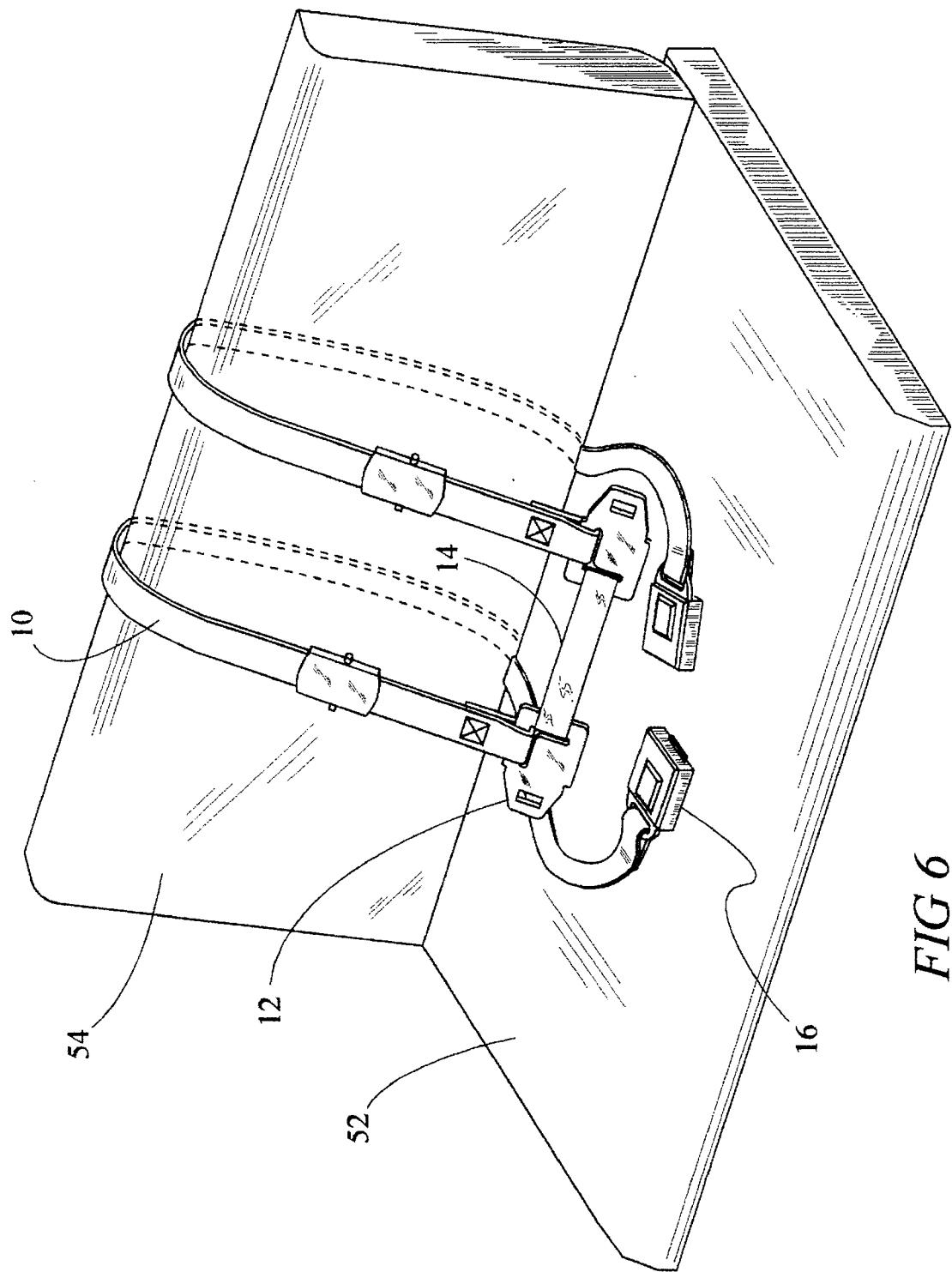
FIG. 6 is a perspective view of an alternative embodiment of the present invention.

In alternative embodiments, buckle tongues 12 are connected by means of a length of rigid material such as plastic or metal that passes through slot 24 and is folded back upon itself in a manner similar to the webbed belt as shown in FIG. 6. Similarly, buckle tongues can be connected by any material of sufficient strength to securely restrain a passenger. This could also include directly welding the pieces together or fabrication of both buckles as a single piece. In the latter instances there is no need for slot 24 in the pieces.

The attachment of buckle clasps 16 and buckle tongues 12 could be reversed and receiver pieces joined together without departure from the presently contemplated invention. In this embodiment, the buckle clasps would be adapted with slots comparable to 24 and 28 while the buckle tongues would only be required to contain a slot such as 44.

Referring now to FIG. 4, when in use, the belt is positioned over a seat 52 such that each belt 10 extends upwardly from buckle tongue 12 over the seat back 54 and downwardly behind seat back 54. Belt 10 further extends between seat back 54 and the top of seat 52 and around the waste of a passenger. Buckle clasp 16 disposed on belt 10 is buckled to buckle tongue 12. The buckle creates a continuous loop which is suitable for restraining a passenger. Because buckle tongues 12 are connected, the two loops that are formed in this manner are also connected, thereby forming a lap restraint. When a person uses the present device, belts 10 extend from near the waist of the passenger, across his chest and over his shoulders, and then around seat back 54.

Figure 5:
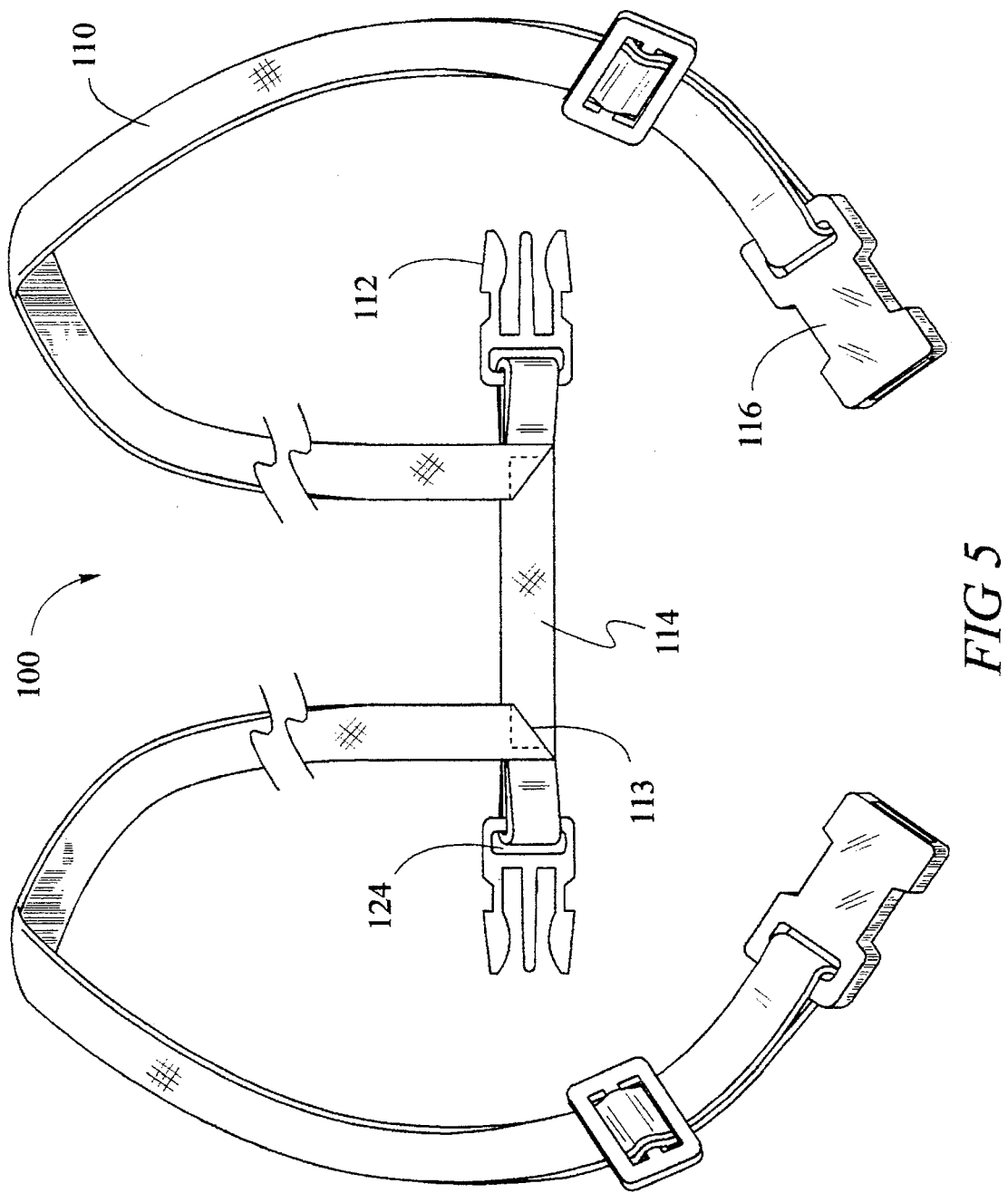
FIG. 5 is a rear view of an alternative embodiment of the present seat belt.

According to an alternative embodiment, a single length of material could be used to construct a seat belt 100, connecting two pairs of buckle tongues 112 and buckle clasps 116 as shown in FIG. 5. In this embodiment, the center portion 114 of the length of material is located between buckle tongues 112. The material is preferably connected to buckle tongues 112, such as by passage through slots 124 designed for this purpose, and then folded back upon itself as shown at 113 and stitched in a manner that allows the extending ends to lie at right angles to the center portion i 14, thereby forming shoulder straps 110. Buckle clasps 116 are affixed to the ends of straps 110 as described above. Straps 110 pass around a seat back and buckle onto buckle onto buckle tongues 112, forming the two loop restraints of the present invention.

The webbing material used in the present invention may be any suitable webbing, such as are commonly used for seat belts and the like. It must be strong enough to withstand the forces that exist under collision conditions, and is preferably also flexible and lightweight.

It will be understood from the foregoing that the belt of the present invention can be carded onto a bus or other vehicle, positioned around a seat back, and used to restrain an individual on the seat. Because the present device is lightweight, it can be included as part of a child's school gear. Should the user desire to exit the restraint, he can do so by opening one or both of the buckles, and lifting one of the shoulder straps over his head. If desired the seat belt need not be removed from the seat and can remain looped around the seat back for future In addition, the present device can be used on seats that do not allow access to the space between the seat back and the seat itself, if access to the sides of the individual seat is provided, as in the case of a bucket seat. In such a ease, the loops would be crossed behind the seat and pass up on either side of the individuals waist, as disclosed above.

The present invention has been described in terms of particular embodiments found or proposed to comprise preferred modes for the practice of the invention. It will be appreciated by those of skill in the art that, in light of the present disclosure, numerous modifications and changes can be made in the particular embodiments exemplified without departing from the intended scope of the invention. For example, the straps may be joined by a clasp across the chest to more securely restrain passengers, or buckle tongues 12 could be replaced with a single one-piece device. All such modifications are intended to be included within the scope of the appended claims.

What is claimed is:

1. A portable seat belt, comprising:

a length of material having a center portion and two ends;

each of said ends including buckle means;

said center portion including means for engaging each of said buckle means such that each of said ends can be affixed to said center portion, whereby two restraining loops are formed.

2. The seat belt according to claim 1 wherein said restraining loops are adjustable.

3. The seal belt according to claim 2 wherein each of said restraining loops includes a means for adjusting the length of said restraining loops.

4. The seat belt according to claim 1 wherein said buckle means comprises a buckle clasp.

5. The seat belt according to claim 1 wherein said means for engaging comprises a buckle tongue.

6. The seat according to claim 1 wherein each of said restraining loops is adapted to encircle a seat back.

* * * * *